United States Patent [19]

Komiya

[11] Patent Number: 5,358,338
[45] Date of Patent: Oct. 25, 1994

[54] LINEAR MOTION ROLLING GUIDE UNIT WITH INSULATING MEMBERS

[75] Inventor: Yoshiyuki Komiya, Kawasaki, Japan

[73] Assignee: Nippon Thompson Co., Ltd., Tokyo, Japan

[21] Appl. No.: 67,609

[22] Filed: May 27, 1993

[30] Foreign Application Priority Data

May 28, 1992 [JP] Japan .................. 4-159998

[51] Int. Cl.⁵ ............................................ F16C 29/06
[52] U.S. Cl. ................................... 384/45; 384/476
[58] Field of Search ............... 384/476, 45, 43, 49, 384/50, 55, 492

[56] References Cited

U.S. PATENT DOCUMENTS

| | | | |
|---|---|---|---|
| 4,109,978 | 8/1978 | Ernst et al. | 384/476 X |
| 4,997,293 | 3/1991 | Ono et al. | 384/492 X |
| 5,059,041 | 10/1991 | Watanabe et al. | 384/476 |

FOREIGN PATENT DOCUMENTS 285016 7/1990 Japan .
3119615 12/1991 Japan .
3121222 12/1991 Japan .
44311 1/1992 Japan .

*Primary Examiner*—Thomas R. Hannon
*Attorney, Agent, or Firm*—Browdy and Neimark

[57] ABSTRACT

The linear motion rolling guide unit of this invention prevents galvanic corrosion by electrically insulating the mounting surfaces of the track rails and the casings as well as the surfaces in contact with other members. The track rails mounted on the base have rail raceway surfaces on both sides thereof. The casings have casing raceway surfaces facing the rail raceway surfaces, are mounted astride the track rails and slide on the track rail. A large number of rolling elements roll between the rail raceway surfaces and the casing raceway surfaces. Insulating members are interposed between the base and the mounting surfaces of the track rails. The mounting surfaces of the casings with respect to the end caps and the table are also provided with insulating members.

18 Claims, 3 Drawing Sheets

LINEAR MOTION ROLLING GUIDE UNIT WITH INSULATING MEMBERS

BACKGROUND OF THE INVENTION

1. Field of the Invention

The present invention relates to a linear motion rolling guide unit which is applied to sliding portions of machine tools, various precision machining equipment and testing equipment.

2. Description of the Prior Art

The linear motion rolling guide unit has been in use for carrying and guiding a relatively heavy equipment back and forth over a relatively long distance with high precision. An example conventional linear motion rolling guide unit is shown in FIG. 6.

FIG. 6 shows a perspective view of a conventional linear motion rolling guide unit. As shown in FIG. 6, the linear motion rolling guide unit has two parallel track rails 2 securely mounted on a base 11 such as bed or mount; two or more sliders 1 mounted astride on each of the track rails 2; and a table 4 securely mounted on these sliders 1 with bolts 33. Equipment placed on the table 4 are moved back and forth along the track rails in the direction of arrow R. In such a conventional linear motion rolling guide unit, the track rails 2 are each formed with raceway surfaces 5 extending longitudinally on both side walls 21 thereof and the sliders 1 are slidably mounted astride each of the track rails 2. Each of the slider 1 is slidable relative to the rail 2 and consists of a casing 3 having raceway surfaces at positions facing the raceway surfaces 5, a number of rolling elements such as balls or cylindrical rolls, which are trapped between the opposing raceway surfaces to allow relative motion between the rail and the casing, and end caps 6 attached to the longitudinal ends of the casing 3.

The slider 1 is freely slidable on the track rail 2 because of the rolling elements that circulate along the raceway surfaces 5 of the track rail 2. The rolling elements in a load region, i.e., those traveling on the raceway surface 5 of the track rail 2 are led into a direction changing path, which is formed in the end cap 6, and further into a return path formed parallel to the raceway surface in the upper part of the casing 3, so that the rolling elements run in an endless circulating path. The rolling of the rolling elements trapped under load between the raceway surfaces of the slider 1 and the raceway surfaces 5 of the track rail 2 permits the slider 1 to be slid on the track rail 2.

A galvanic corrosion prevention bearing is disclosed in the Japanese Utility Model Laid-Open No. 85016/1990. This ball-and-roller bearing has both or one of its inner and outer races coated over the outer surface with an insulating film. That is, the race to be coated with the insulating film is formed with an annular groove along the circumferential surface, into which an insulating film is installed. Further, the center of the annular groove is shifted from the center of the bearing so as to reliably fix the insulating film to the race, preventing dislocation or floating of the insulating film.

Another example of the galvanic corrosion prevention bearing is disclosed in the Japanese Utility Model Laid-Open No. 121222/1991. In this bearing, the insulating coating over the surface of the race is formed of polyphenylene sulfide resin, which contains glass fibers, so that the coating has an excellent water absorption, heat resistance and strength, thus providing a stable anti-galvanic corrosion performance.

Still another example of the galvanic corrosion prevention bearing is disclosed in the Japanese Patent Laid-Open No. 4311/1992. In this ball-and-roller bearing, the outer diameter surface and end surface of the outer race are covered with a fiber reinforced composite material.

A further example of the galvanic corrosion prevention bearing is disclosed in the Japanese Utility Model Laid-Open No. 119615/1991. This ball-and-roller bearing consists of a pair of bearings with the external diameter surfaces and the outer side surfaces of each outer race formed with an insulating coating and with the facing inner side surfaces thermally conducted to each other.

As described above, the technical philosophy of coating the race with an insulating material is already known in the ball bearings. In the linear motion rolling guide units, however, a technique has yet to be developed for electrically insulating the members. In the linear motion rolling guide unit as shown in FIG. 6, where sliders 1 move back and forth on the track rails 2, when a current flows through the track rails 2 and the sliders 1, a galvanic corrosion occurs between the track rails 2 and other members, i.e., base 11 and sliders 1, and between the sliders 1 and other members, i.e., table 4 and track rails 2, degrading the precision of the mounting surfaces or sliding surfaces of these members as well as machining precision and durability of machine tools.

SUMMARY OF THE INVENTION

A primary object of this invention is to solve the above-mentioned problems. That is, it is an object of the invention to provide a linear motion rolling guide unit, in which the rolling elements such as balls and cylindrical rollers travel through the raceways formed between the casing raceway surfaces of the casings and the rail raceway surfaces of the track rails and which—under conditions that electric current may flow into the linear motion rolling guide unit as when used on the railroad cars and factory facilities such as FMS—prevents galvanic corrosion of constitutional members by electrically insulating them by interposing insulating members between the mounting surfaces of the track rails and the casings, thereby improving durability, elongating the service life of the rolling guide unit.

Another object of the invention is to provide a linear motion rolling guide unit, which comprises: track rails mounted on the base and having rail raceway surfaces on both sides thereof; casings mounted astride each of the track rails and having casing raceway surfaces facing the rail raceway surfaces; many rolling elements running between the rail raceway surfaces and the casing raceway surfaces; a table mounted on the casings; and insulating members attached to at least either the mounting surfaces of the track rails or the mounting surfaces of the casings.

Since the insulating members are attached to at least either the mounting surfaces of the track rails or the mounting surfaces of the casings, even when this linear motion rolling guide unit is used under conditions where it may be subjected to current application, electric current can be prevented from flowing between the track rails, casings and other members and between the rolling elements, the rail raceway surfaces and the casing raceway surfaces by properly interposing the insulating members, thus preventing galvanic corrosion of these mounting surfaces, prolonging the service life of the unit.

In this linear motion rolling guide unit, the bolts for fastening the track rails and the casings to other members are made of insulating material such as ceramics, preventing the possibility of current flowing through the bolts. This in turn prevents galvanic corrosion of the bolts and parts nearby.

Since the surfaces of the mounting bolt holes in the track rails and the casings are coated with insulating material, the current can be prevented from flowing through the mounting bolt holes and therefore galvanic corrosion of parts near the bolt holes.

Further, in this linear motion rolling guide unit, since the casing raceway surfaces of the casings are coated with the insulating material, it is possible to prevent the current from flowing through the casing raceway surfaces and the rolling elements, preventing galvanic corrosion of the rolling elements and the casing raceway surfaces as well as parts near them.

Furthermore, since the insulating material is plastics such as polyphenylene sulfide resin, it is possible not only to provide electrical insulation but also secure sufficient rigidity and stable heat resistance at high temperatures.

DETAILED DESCRIPTION OF EMBODIMENTS

Figure 1:
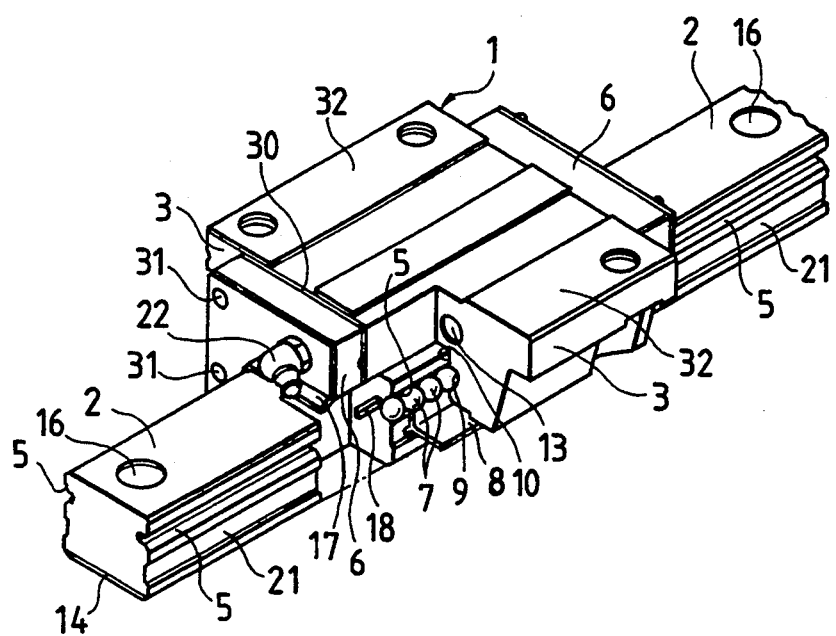
FIG. 1 is a partly cutaway perspective view of the linear motion rolling guide unit as one embodiment of the present invention.
Figure 2:
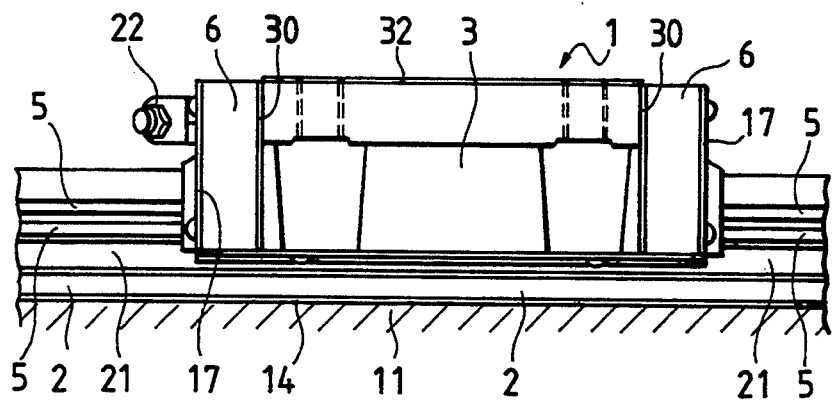
FIG. 2 is a front view of the linear motion rolling guide unit shown in FIG. 1.

Now, by referring to the accompanying drawings, embodiments of the linear motion rolling guide unit according to this invention will be described. In FIG. 1 and FIG. 2, components with the same purposes as those of FIG. 6 are assigned like reference numerals, and duplicate explanations are omitted.

Figure 6:
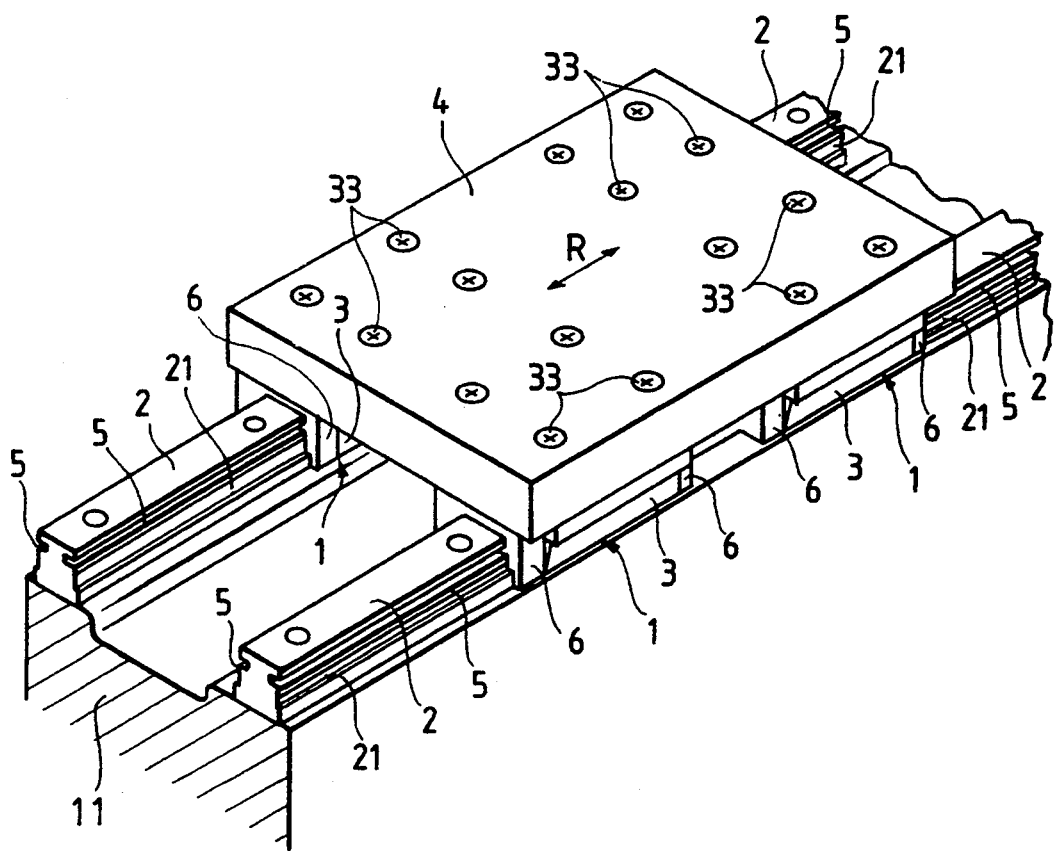
FIG. 6 is a perspective view of an example of a conventional linear motion rolling guide unit.

As shown in FIG. 6, the linear motion rolling guide unit of FIG. 1 has two parallel track rails 2 securely mounted on a base 11; two or more sliders 1 mounted astride on each of the track rails 2; and a table 4 securely mounted on these sliders 1. Equipment placed on the table 4 are moved back and forth along the track rails. In this linear motion rolling guide unit, the track rails 2 are each formed with rail raceway surfaces 5 (hereinafter referred to as raceway surfaces) extending longitudinally on both side walls 21 thereof and the sliders 1 are slidably mounted astride each of the track rails 2. Each of the slider 1 has a casing 3; end caps 6 secured to the longitudinal ends of the casing 3; and end seals 17 attached to the end surfaces of the end caps 6. The casing 3 and the end caps 6 are each formed at their undersides with a rail accommodating recess 10, through which the track rail 2 passes, so that the casing 3 and the end caps 6 can slide on the track rail 2.

The slider 1 has a casing 3 slidable relative to the track rail 2 and having casing raceway surfaces 9 (hereinafter referred to as raceway surfaces) at positions facing the rail raceway surfaces 5; a large number of rolling elements 7 like balls or cylindrical rollers (in the figure balls are shown) trapped between the raceway surfaces 5 and 9 to allow the relative motion to the raceway surfaces 5, 9; an underseal member 8 to provide a seal between the track rail 2 and the casing 3; and end caps 6 mounted to the longitudinal ends of the casing 3, the longitudinal direction being the same as the sliding direction of the casing. Further, the casing 3 is provided with retaining bands 18 which retain the rolling elements 7 in position, preventing them from falling out of the casing 3.

The end cap 6 is provided with an end seal 17 that provides a seal between the track rail 2 and the slider 1 and also provided with a grease nipple 22 that supplies lubricant to the sliding surface between the track rail 2 and the slider 1. The end cap 6 is mounted to the end surface of the casing 3 by inserting screws into mounting holes 31 formed at the ends of the casing 3. The end cap 6 is formed with a direction changing path (not shown) which changes the direction of the rolling elements 7 to circulate them endlessly.

The linear motion rolling guide unit is formed as shown above, and the presence of the rolling elements 7 that circulate along the raceway surface 5 of the track rail 2 allows the slider 1 mounted astride the track rail 2 to be freely slidable on the rail. The rolling elements 7 running under load on the raceway surface 5 of the track rail 2 are then led into the direction changing path formed in the end cap 6 and then moved to a return path 13 formed parallel to the raceway surface 9 in the upper part of the casing 3. In this way, the rolling elements 7 circulate through the endless raceway. With the loaded rolling elements 7 rolling between the raceway surface 9 of the casing 3 and the raceway surface 5 of the track rail 2, the slider 1 can slide relative to the track rail 2.

As shown in FIG. 1 and FIG. 2, in particular, the linear motion rolling guide unit of this invention is characterized by an insulating member 14 attached to the mounting surface of the track rail 2 and/or insulating members 30, 32 covering the mounting surface of the casing 3. The mounting surface of the track rail 2 is the underside of the track rail 2 that comes in contact with the base 11. The mounting surface of the casing 3 comprises the upper surface of the casing 3 that contacts the table 4 (see FIG. 6) and the longitudinal end surfaces of the casing 3 that are in contact with the end caps 6. The insulating members 14, 30, 32 may be ceramics or plastics that has an electric insulating function. For example, the insulating materials 14, 30, 32 may be in the form of a coating film of such plastics as polyphenylene sulfide resin. The polyphenylene sulfide resin has a chemical formula of $(C_6H_5S)_n$ and is a crystal polymer with high stiffness. Mixed with glass fiber, the polyphenylene sulfide resin can be used to form a coating with stable flame resistance or heat resistance even at high temperatures.

Figure 3:
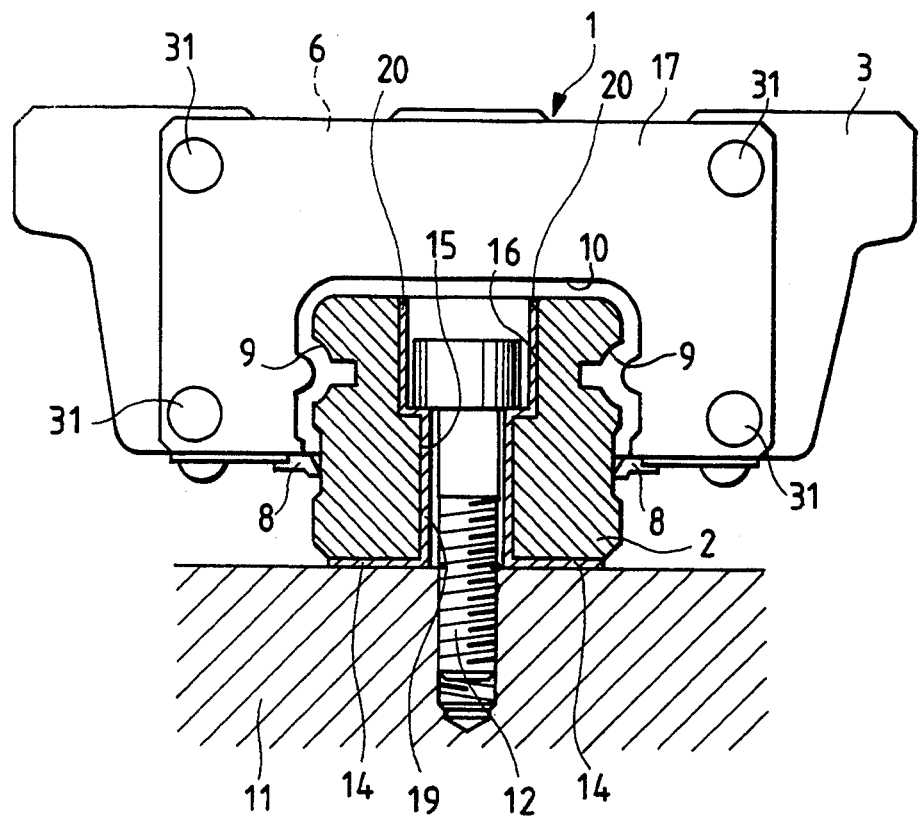
FIG. 3 is a cross section showing an essential portion of another embodiment of the linear motion rolling guide unit according to the invention.

Next, another embodiment of the linear motion rolling guide unit will be described by referring to FIG. 3. In this linear motion rolling guide unit, the bolts 12, 33 (see FIG. 6) for fastening the track rail 2 and the casing 3 to other members are formed of such insulating material as ceramics. Other member to which track rail 2 is mounted may, for example, be the base 11. Other member to which to mount the casing 3 may for example be the table 4, as shown in FIG. 6. Further, mounting bolt holes 15, 16 in the track rail 2 are coated over the surface with insulating members 19, 20. Though not shown, the surface of the mounting bolt holes in the casing 3 are similarly coated with insulating members. The insulating members for coating may use such a plastic material as the above-mentioned polyphenylene sulfide resin.

Figure 4:
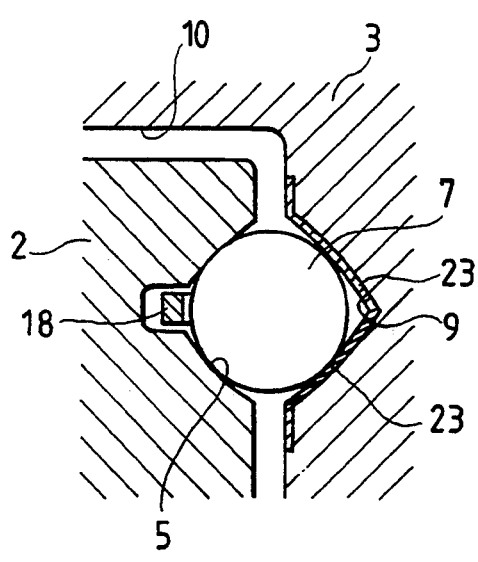
FIG. 4 is a cross section showing an essential portion of still another embodiment of the linear motion rolling guide unit according to the invention.

Further, by referring to FIG. 4, still another embodiment of the linear motion rolling guide unit will be explained. This linear motion rolling guide unit has track rails 2; casings 3 constituting sliders that are mounted astride the track rails 2; and rolling elements 7 such as balls which run rolling along the raceway formed between the raceway surface 5 of the track rail 2 and the raceway 9 of the casing 3. The linear motion rolling guide unit of this embodiment is characterized in particular in that the insulating member 23 is applied over the raceway surface 9 of the casing 3. The insulating member 23 may use such plastics as the above-mentioned polyphenylene sulfide resin.

Figure 5:
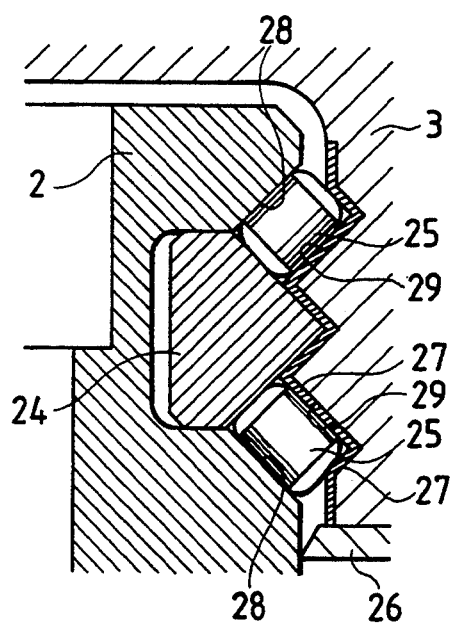
FIG. 5 is a cross section showing an essential portion of a further embodiment of the linear motion rolling guide unit according to the invention.

Next, a further embodiment of the linear motion rolling guide unit will be explained by referring to FIG. 5. This linear motion rolling guide unit has track rails 2; casings 3 constituting sliders that are mounted astride the track rails 2; rolling elements 25 such as cylindrical rollers which run rolling along the raceway formed between the raceway surface 28 of the track rail 2 and the raceway 29 of the casing 3; and underseals 26 arranged at the underside of the casing 3. The rolling elements 25 are retained in the casing 3 by a retainer 24 attached to the casing 3. The linear motion rolling guide unit of this embodiment is characterized in particular in that the raceway surface 29 of the casing 3 is coated with the insulating member 27. The insulating member 27 may use such plastics as the above-mentioned polyphenylene sulfide resin.

I claim:

1. A linear motion rolling guide unit comprising:
   a base;
   track rails having bolt insertion holes so as to fix the track rails to the base, and having rail raceway surfaces on both side walls thereof;
   mounting bolts inserted through the bolt insertion holes in the track rails and screwed into the base to fix the track rails to the base;
   casings mounted astride the track rails so as to be slidable on the track rails, and having casing raceway surfaces formed at positions facing the rail raceway surfaces;
   end caps secured to the longitudinal ends of the casing, a longitudinal direction of the casing being the same as the sliding direction of the casing;
   many rolling elements traveling rolling between the rail raceway surfaces and the casing raceway surfaces, the rolling elements changing their directions in the end caps;
   a table mounted on the casings; and
   insulating members secured to mounting surfaces of the track rails facing the base when the track rails are secured to the base and to surfaces of the bolt insertion holes in the track rails.

2. A linear motion rolling guide unit according to claim 1, wherein the insulating members are secured to surfaces of the casings facing the table when the table is secured to the casings.

3. A linear motion rolling guide unit according to claim 1, wherein the insulating members are secured to surfaces of the casings facing the end caps when the end caps are secured to the casings.

4. A linear motion rolling guide unit according to claim 1, wherein the mounting bolts for fixing the track rails to the base are made of ceramic insulating material.

5. A linear motion rolling guide unit according to claim 4, wherein said insulating members are made of material selected from the group consisting of plastics, ceramics and glass fiber reinforced plastics.

6. A linear motion rolling guide unit according to claim 1, wherein the casing raceway surfaces of the casings are securely coated with the insulating members.

7. A linear motion rolling guide unit according to claim 6, wherein said insulating members are made of material selected from the group consisting of plastics, ceramics and glass fiber reinforced plastics.

8. A linear motion rolling guide unit according to claim 1, wherein the longitudinal ends of the casings have the insulating members securely attached thereto.

9. A linear motion rolling guide unit according to claim 8, wherein said insulating members are made of material selected form the group consisting of plastics, ceramic and glass fiber reinforced plastic.

10. A linear motion rolling guide unit according to claim 1, wherein the rolling elements are balls.

11. A linear motion rolling guide unit according to claim 10, wherein said insulating members are made of material selected from the group consisting of plastics, ceramics and glass fiber reinforced plastic.

12. A linear motion rolling guide unit according to claim 1, wherein the rolling elements are cylindrical rollers.

13. A linear motion rolling guide unit according to claim 12, wherein said insulating members are made of material selected from the group consisting of plastics, ceramics and glass fiber reinforced plastics.

14. A linear motion rolling guide unit according to claim 1, wherein the insulating members are made of plastics.

15. A linear motion rolling guide unit according to claim 1, wherein the insulating members are made of a polyphenylene sulfide resin.

16. A linear motion rolling guide unit according to claim 1, wherein the insulating members are made of a material containing a polyphenylene sulfide resin and a glass fiber.

17. A linear motion rolling guide unit according to claim 1, wherein the insulating members are made of ceramics.

18. A linear motion rolling guide unit according to claim 1, wherein said insulating members are made of material selected from the group consisting of plastics, ceramics and glass fiber reinforced plastics.

* * * * *